(12) United States Patent
Grasun et al.

(10) Patent No.: US 11,951,914 B2
(45) Date of Patent: Apr. 9, 2024

(54) OVERMOLDED SPRING ON VISION BRACKET

(71) Applicant: VEONEER SWEDEN AB, Vargarda (SE)

(72) Inventors: Maxim Grasun, Iasi (RO); Catalin Padurariu, Iasi (RO); Catalin Rotariu, Iasi (RO)

(73) Assignee: Magna Electronics Sweden AB, Vargarda (SE)

( * ) Notice: Subject to any disclaimer, the term of this patent is extended or adjusted under 35 U.S.C. 154(b) by 161 days.

(21) Appl. No.: 17/686,675

(22) Filed: Mar. 4, 2022

(65) Prior Publication Data
US 2022/0281391 A1 Sep. 8, 2022

(30) Foreign Application Priority Data

Mar. 8, 2021 (EP) .................................... 21161302

(51) Int. Cl.
| | | |
|---|---|---|
| *B60R 11/04* | (2006.01) | |
| *G03B 17/56* | (2021.01) | |
| *B60R 11/00* | (2006.01) | |

(52) U.S. Cl.
CPC ............ *B60R 11/04* (2013.01); *G03B 17/561* (2013.01); *B60R 2011/0026* (2013.01); *B60R 2011/0071* (2013.01)

(58) Field of Classification Search
CPC .... B60R 11/04; B60R 11/0026; G03B 17/561
See application file for complete search history.

(56) References Cited

U.S. PATENT DOCUMENTS

| | | | | |
|---|---|---|---|---|
| 4,682,903 A | * | 7/1987 | Agata | B41J 2/28 400/124.21 |
| 5,738,177 A | * | 4/1998 | Schell | B25B 23/14 173/181 |
| 10,207,654 B2 | * | 2/2019 | Edgarian | B60R 11/04 |
| 10,596,981 B2 | | 3/2020 | Granholm | |
| 10,953,815 B2 | * | 3/2021 | Edgarian | H04N 23/51 |

(Continued)

FOREIGN PATENT DOCUMENTS

| | | |
|---|---|---|
| EP | 3 461 689 B1 | 12/2020 |
| EP | 3 566 907 B1 | 3/2021 |
| JP | 2020114728 B2 | 3/2021 |

OTHER PUBLICATIONS

European Search Report of EP 211 61 302.1 dated Jul. 5, 2021.

*Primary Examiner* — Adam J Waggenspack
(74) *Attorney, Agent, or Firm* — DICKINSON WRIGHT PLLC

(57) ABSTRACT

A bracket (10) adapted to be mounted to a pane of a motor vehicle having a base part (11) and at least one fixation arrangement (12*a*, 12*b*, 12*c*) configured to fixate a camera carrier (35) carrying at least one camera (14) to the bracket (10). Each of the at least one fixation arrangement (12*a*, 12*b*, 12*c*) includes a holder (13*a*, 13*b*, 13*c*) and a spring element (15) configured to exert an elastic locking force on a pin (19) of the camera carrier (35). The spring element (15) forms a base element (17) configured to be held in said holder (13). The spring element (15) comprises a fixation tongue (16) bendably connected to the base element (17) at one end (23) and adapted to exert said elastic locking force on the pin (19) of the camera carrier (35).

14 Claims, 4 Drawing Sheets

(56) References Cited

U.S. PATENT DOCUMENTS

| | | | | |
|---|---|---|---|---|
| 2013/0015288 A1* | 1/2013 | Hernandez | ............... | F16L 3/13 |
| | | | | 248/223.41 |
| 2015/0150664 A1* | 6/2015 | Crossman | ............ | A61C 17/222 |
| | | | | 74/96 |
| 2019/0344726 A1 | 11/2019 | Granholm | | |

* cited by examiner

OVERMOLDED SPRING ON VISION BRACKET

CROSS-REFERENCE TO RELATED APPLICATIONS

This application claims the benefit of priority under 35 U.S.C. § 119 to European Patent Application No. EP 21161302.1, filed Mar. 8, 2021, the contents of which are incorporated herein by reference in their entirety.

FIELD OF THE INVENTION

The invention relates to a bracket adapted to be mounted to a glazing panel (window or pane) of a motor vehicle, such as a windshield, the bracket having a base part and at least one fixation arrangement configured to fixate a camera carrier carrying at least one camera to the bracket. Each of the at least one fixation arrangement including a holder and a spring element, wherein the spring element has a base element configured to exert an elastic locking force on a pin of the camera carrier.

BACKGROUND

A bracket of the above-described type generally is known for example from EP Publication No. 3 566 907 A1. Here, the spring element is a strip having a through hole engaged by a protrusion connected to the base plate of the bracket.

Known designs of the fixation arrangement generally suffer from one or more of the following disadvantages: The retention force exerted on the pin by the spring element is limited and depends on the installation force; therefore, it is not possible to increase the retention force above a certain value because the installation would otherwise become impossible. A relatively long tolerance chain is involved. High forces are needed for engagement and disengagement of a pin in the holder, which makes mounting and dismounting of the camera carrier from the bracket difficult. Additional costs are generated for the time-consuming manual or automated installation of the spring element. A plastic snap fit used for the fixation of the spring element can be sheared by the edge of the spring element sometimes during installation, leading to the possibility of loosing the spring element during transportation to the customer.

SUMMARY AND INTRODUCTORY DESCRIPTION OF EMBODIMENTS OF THE PRESENT INVENTION

The problem underlying the present invention is to provide a bracket to which a camera carrier can be mounted and unmounted with lower forces, while enabling a relatively high retention force exerted by the spring element on a pin of the camera carrier, and having a low tolerance chain.

Embodiments of the invention solves the above-referenced object embodiments of the invention incorporate the spring element having a fixation tongue bendably connected to the base element at one end and adapted to exert the elastic locking force on the pin of the camera carrier.

Embodiments of the inventive concept overcome shortcomings of the prior art of high forces required for mounting and unmounting the camera carrier to/from the bracket. During mounting and unmounting, the fixation tongue can be tensioned e.g. by a simple tool to allow pin entrance or exit with low force. By the inventive fixation tongue, a higher retention force of the pin in the holder can be reached, as compared to prior art designs. The specific retention force can be optimized by modifying bend angles and thickness and/or length of the spring element. Since the fixation tongue pushes the pin of the camera carrier towards the vehicle windshield, a short tolerance chain is achieved by the invention.

Preferably in accordance with embodiments of the present invention, the spring element is connected to the holder by overmolding. The spring element can be made of metal, in particular sheet metal or spring metal, such that the fixation tongue is a leaf spring. In a preferred embodiment, the spring element is a single part made of metal. The holder is preferably made of thermoplastic. In a preferred embodiment, the holder is integrally formed with the base part as a single part made of thermoplastic. Due to the preferred overmolding of the holder over the spring element, time consuming steps of mounting the spring element to the holder as in the prior art are not required. Also a very stable joint between the spring element and the holder is achieved by the overmolding.

Preferably the fixation tongue include a notch formed to receive and hold the pin of the camera carrier in the mounted state. The preferred notch contributes to achieving higher retention forces, i.e. forces retaining the pin in the holder, and lower mounting/dismounting forces, i.e. forces required to engage/disengage the pin from the holder.

Preferably the base element of the spring element includes a central opening surrounding the fixation tongue in a plane view on the spring element. In this embodiment, the fixation tongue preferably extends through the central opening of the base element, in particular to the outside of the holder. These features contribute to an easy mounting/dismounting procedure, because the free end of the fixation tongue can be easily bent away from the holder to allow entrance and exit of the pin with low mounting forces.

For similar reasons, the fixation tongue of the spring element preferably includes a handling section protruding to the outside of the holder through a mounting opening of the holder. The handling section can be operated manually or by a simple tool in the mounting/dismounting process. In this embodiment, the handling section is preferably arranged between the notch and a free end of the fixation tongue.

In a preferred embodiment, the fixation tongue of the spring element includes a protruding section protruding into the hollow space. In this case, the protruding is arranged between a connection end of the fixation tongue and the notch. The protruding section allows to place the notch out of the plane of the base element more closely towards a pin receiving recess in the holder. As a result, a preferred design is achieved where the fixation tongue but not the base element interacts with the pin, leading to lower mounting/dismounting forces.

In a practical embodiment of the present invention, the holder preferably includes a hollow space having an insertion opening through which a pin of the camera carrier can be inserted into, and withdrawn from, the hollow space. In this case, a connection end of the fixation tongue is preferably positioned proximal to the insertion opening and a free end of the fixation tongue is positioned distal to insertion opening.

Reverting to the connection of the spring element to the holder, the base element of the spring element preferably includes a proximal connection section at a proximal end of the base element and/or a distal connection section at a distal end of the base element. In this case, the proximal connection portion and/or the distal connection section may include one or more connection holes enabling an intimate joint of the fixation tongue to the holder, in particular by overmolding.

BRIEF DESCRIPTION OF THE DRAWINGS

In the following embodiments of the invention shall be illustrated with reference to the accompanying drawings, wherein.

DETAILED DESCRIPTION

Figure 1:
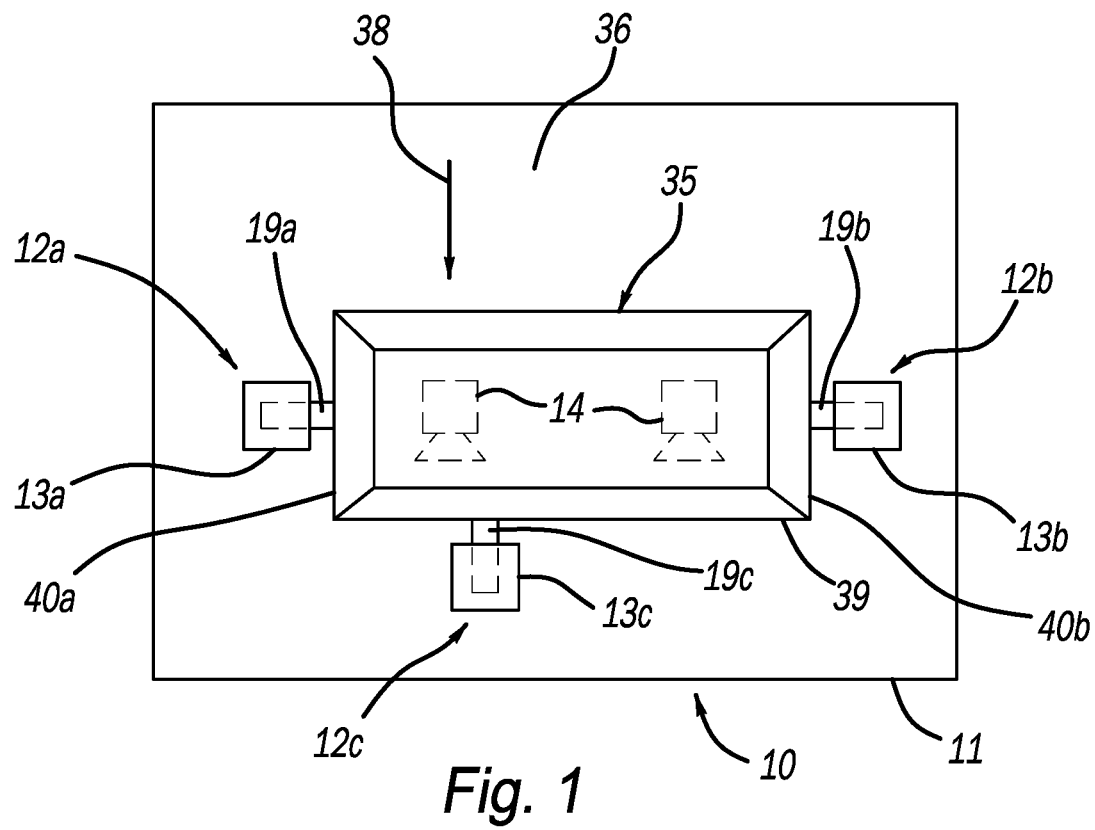
FIG. 1 shows a schematic plane view on the bracket from the side of the vehicle interior.

The bracket 10 shown in FIG. 1 is configured to be mounted to the windshield (not shown) of a motor vehicle. The bracket 10 includes, at a windshield side 34, a windshield facing surface 33 directed to the vehicle windshield, and, at a windshield averted side 37, a windshield averted surface 36 directed to the vehicle interior and arranged opposite the windshield facing surface 33. The bracket forms a base part 11, like a base plate, and one or more fixation arrangements 12a, 12b, 12c configured to fixate a camera carrier 35 to the bracket 10. In the present embodiment, three fixation arrangements 12a, 12b, 12c are provided. The number of fixation arrangements 12a, 12b, 12c may be different from three.

The camera carrier 35 carries one or more camera units 14 which in the mounted state are positioned and aligned to look through the windshield and capture images from the surrounding of the motor vehicle. The camera carrier 35 includes one or more pins 19a, 19b, 19c, where the number of pins 19a, 19b, 19c corresponds to the number of fixation arrangements 12a, 12b, 12c, and each pin 19a, 19b, 19c is configured to interact with a corresponding fixation arrangement 12a, 12b, 12c in a locking manner in the mounted state shown in FIGS. 1, 3 and 7. The camera carrier 35 is mounted to the bracket 120 by moving the camera carrier 35 along an insertion direction 38 (see FIG. 1) until the pins 19a, 19b, 19c enter and get locked within the fixation arrangements 12a, 12b, 12c, which will be explained below.

In the embodiment of FIG. 1, a pin 19c is provided at a front of the camera carrier 35 and positioned parallel to the insertion direction 38, which is called a longitudinal pin 39c interacting with a longitudinal fixation arrangements 12c, while a pin 19a, 19b is provided at every side 40a, 40b of the camera carrier 35 and oriented perpendicular to the insertion direction 38, which are called lateral pins 39a, 39b each interacting with a lateral fixation arrangement 12a, 12b. The number of lateral fixation arrangements 12a, 12b may be different from two and the number of longitudinal fixation arrangements 12c may be different from one. Each fixation arrangement 12a, 12b, 12c forms a holder 13a, 13b, 13c and a spring element 15 configured to lock a pin 19 in the respective holder 13a, 13b, 13c, which will be explained in detail below. The one or more holders 13a, 13b, 13c are preferably made of a thermoplastic material. The base part 11 and the one or more holders 13a, 13b, 13c can be made as a single integrated part of the same material, for example of a thermoplastic material.

In the following, a single fixation arrangement 12 interacting with a single pin 19 is described with respect to FIGS. 2 to 8. The fixation arrangement 12 of FIGS. 2 to 8 can advantageously be applied to the lateral fixation arrangements 12a, 12b of FIG. 1, but can also be applied with little modifications to the longitudinal fixation arrangement 12c of FIG. 1.

Figure 2:
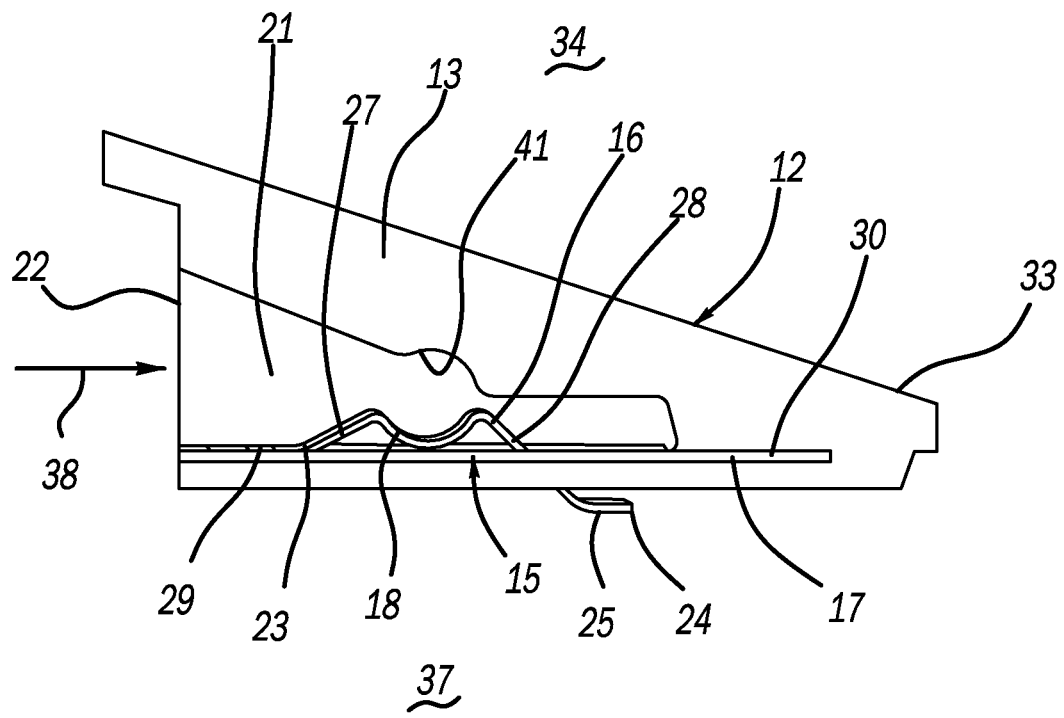
FIG. 2 shows a sectional side view on a fixation arrangement.

As mentioned above, the fixation arrangement 12 includes a holder 13 and a spring element 15 connected to the holder 13. The holder 13, which may be made of a thermoplastic material, has a hollow space 21 in the inside for receiving the pin 19. The holder 13 forms an insertion opening 22 allowing insertion of the pin 19 into the hollow space 21. The holder 13 preferably forms a recess 41 for receiving and holding the pin 19 in the locked state. The recess 41 may be rounded or arc-shaped in a cross section as shown in FIG. 2.

Figure 9:
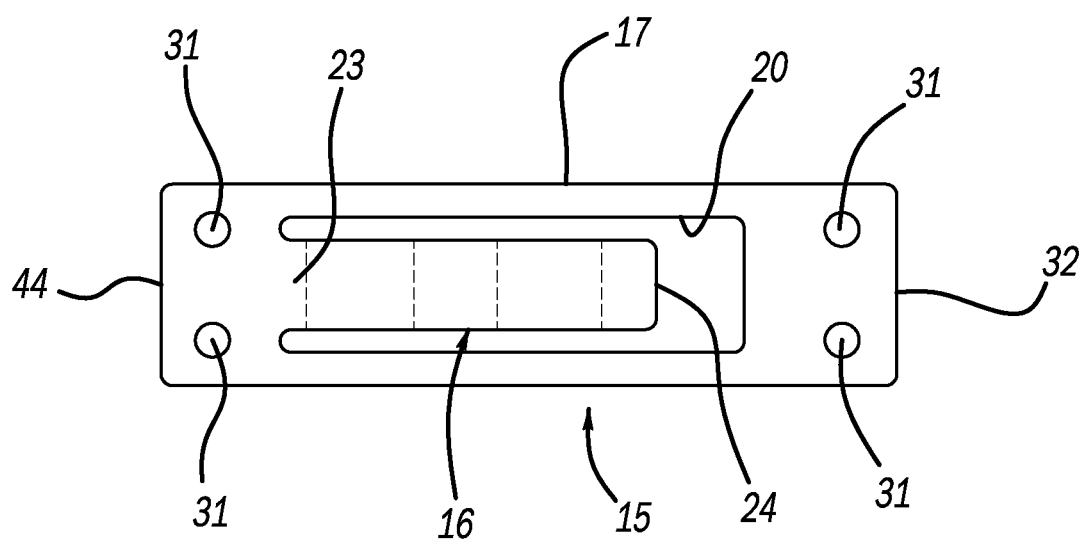
FIG. 9 shows a plane view on the spring element in a direction perpendicular to the plane of the base element.

The spring element 15 is provided in the form of a preferably strip-shaped base element 17 and a preferably strip-shaped fixation tongue 16 bendably connected the base element 17 at a connection end 23 of the fixation tongue 16. The base element 17 defines a proximal end 43 arranged proximal to the insertion opening 22 in the mounted state, a distal end 32 arranged distal to the insertion opening 22 and opposite the proximal end 44, and a central opening 20 which is completely surrounded by the base element 17, as can be seen best in a plane view onto the spring element 15, see FIG. 9, i.e. in a direction perpendicular to the plane defined by the flat base element 17. The base element 17 has therefore the form of a closed ring, with the central opening 20 forming the ring hole. In this plane view, the base element 17 complete surrounds the fixation tongue 16. The central opening 20 is U-shaped in this plane view, see FIG. 9, due to the connection of the fixation tongue 16 to the base element 17 at the connection end 23 of the fixation tongue 16. The fixation tongue 16 is connected to the base element 17 at its connection end 23, only, but is free otherwise. The fixation tongue 16 thus defines a free end 24 which can freely move and is arranged opposite its connection end 23.

The spring element 15 can be manufactured from a single piece of sheet metal or spring metal by drilling connection holes 31 into the base element 17, cutting the U-shaped central opening 20 into the base element 17 (see FIG. 9), and deforming the fixation tongue 16 to form the different sections 27, 18, 28, 25 thereof.

Advantageously, the spring element 15 is connected to the holder 13, in particular at the distal end 32 and/or at the proximal end 44 of the base element 17. The connection is preferably by overmolding the holder 13, made e.g. of thermoplastics, over the base element 17 of the spring element 15. The base element 17 preferably forms one or more connection holes 31 in the region of the distal end 32 and/or the proximal end 44, which can be filled by material 13 of the holder during the connection or molding process, in order to enable a more intimate and stable joint between the spring element 15 and the holder 13. Other configurations of holes or some bends may be added to the plastic material of the holder 13 and/or to the metal spring element 13 if needed with respect to the overmolding process. Other techniques of connecting the spring element 15 to the holder 13 are possible, for example by welding.

Figure 7:
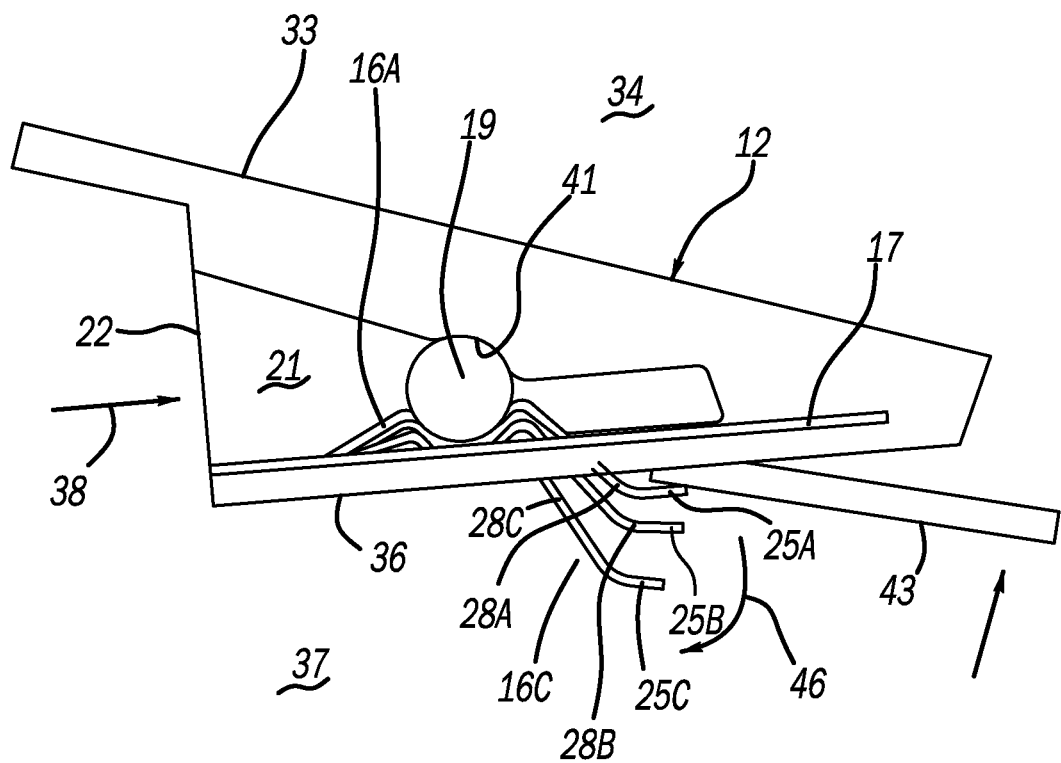
FIG. 7 shows a side sectional view of the fixation arrangement in the mounted state.
Figure 8:
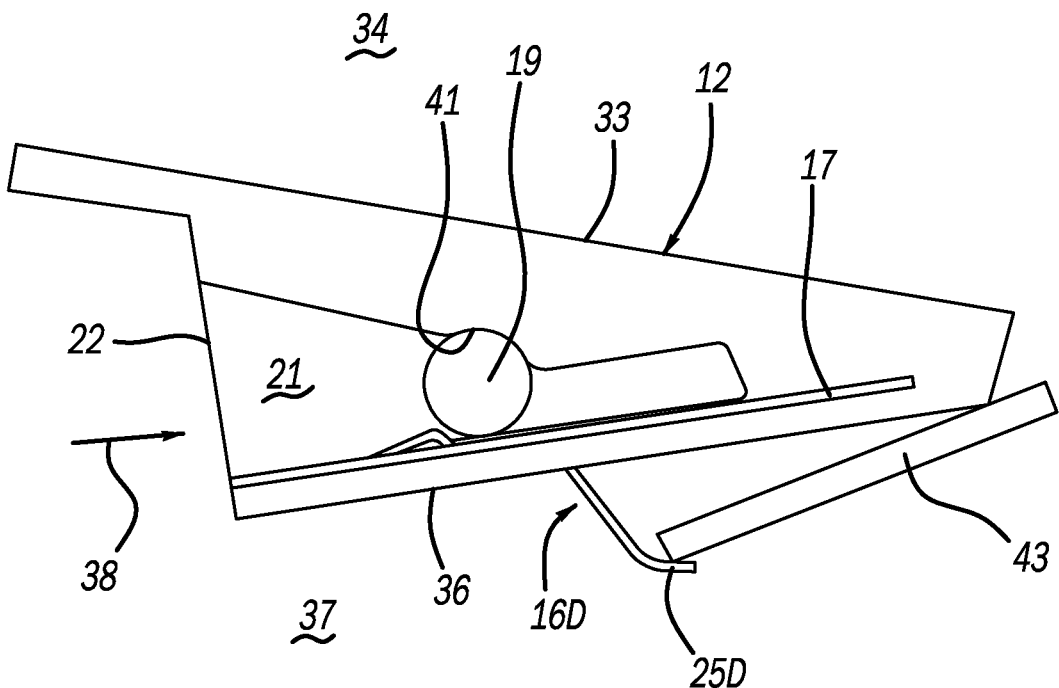
FIG. 8 shows a side sectional view of the fixation arrangement at in different times in an unmounting process.

The form of the spring element can be best seen in a view parallel to the plane defined by the base element 17 and parallel to the axis of the pin 19, like in FIGS. 2, 7 and 8. Going from the connection end 23 to the free end 24, the fixation tongue 16 has a protruding section 27 protruding from the plane of the base element 17 into hollow space 21. The protruding section 27 may be an inclined section as shown in FIG. 2, being inclined towards the hollow space 21 in the mounted state at an angle between 15° and 45°, for example 30°.

Figure 3:
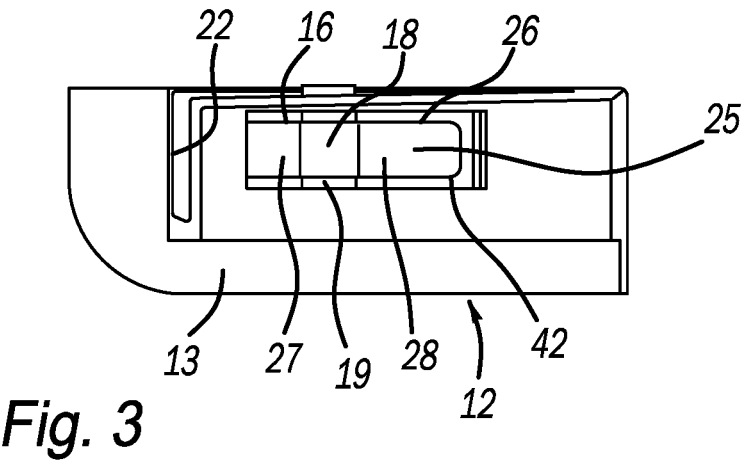
FIG. 3 shows a view on a fixation arrangement from the side of the vehicle interior.
Figure 4:
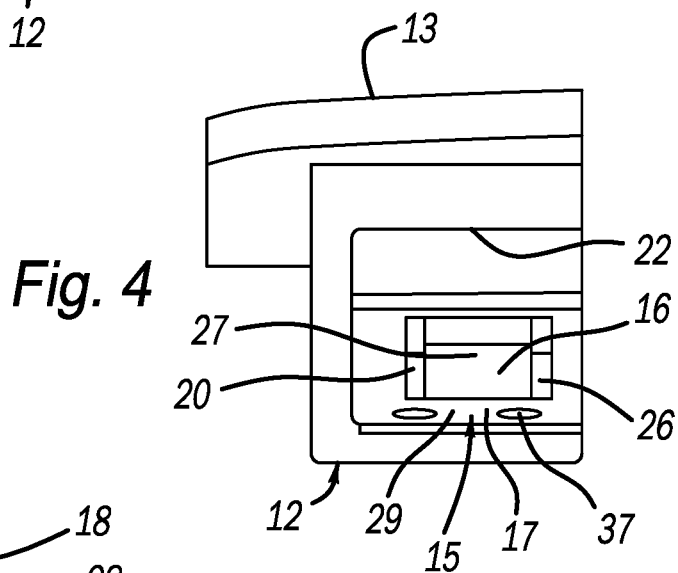
FIG. 4 shows a view on a fixation arrangement along the insertion direction.
Figure 5:
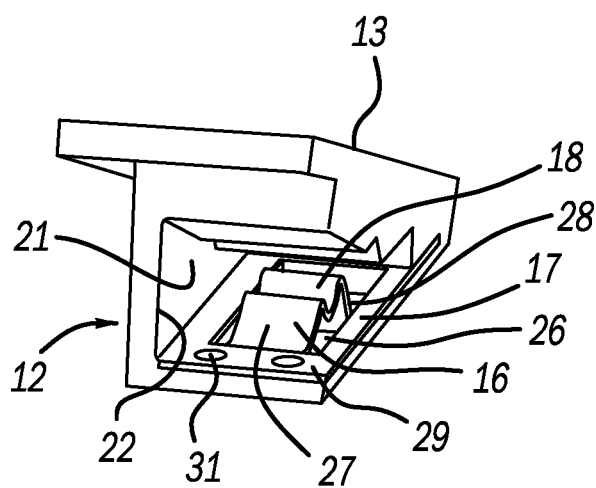
FIG. 5 shows a perspective view on a fixation arrangement in the direction towards the insertion opening.
Figure 6:
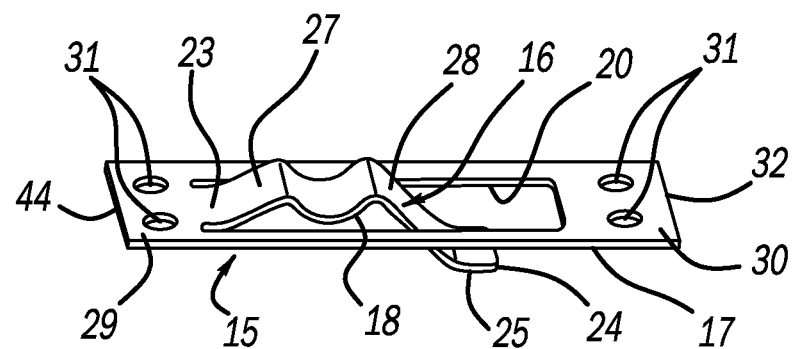
FIG. 6 shows a perspective view of the spring element.

The protruding section 27 is followed by a notch section or notch 18 configured and formed to receive and hold the pin 19 of the camera carrier 35 in the mounted state shown in FIGS. 3 and 7. The notch 18 may be rounded or arc-shaped in a cross section as shown in FIG. 2, similar to the recess 41 of the holder 13. In the mounted state, the fixation tongue 16 (16A in FIG. 7) presses the pin 19 into the recess 41 and holds it in the recess 41, such that the pin 19 is locked in this position. In other words, in the mounted or locked state the fixation tongue 16 exerts a locking force on the pin 19. By exerting a locking force on all pins 19 of the camera container 35, the camera container 35 is fixed in a stable position.

Following the notch 18, the fixation tongue 16 forms a handling section 28 extending from then hollow space 21 through the central opening 20 of the spring element 15 and through a corresponding opening 42 of the holder 13 to the other side of the spring element 15 and to the outside of the holder 13, which can be seen in FIGS. 2, 7 and 8. The opening 42 of the holder 13 corresponds with the central opening 20 of the spring element 15 and is provided on the windshield averted surface 36 at the windshield averted side 37 of the holder 13. The handling section 28 is provided for unlocking the pin 19 and remove the pin 19 from the notch 18 either manually or by means of a tool, as will be described later.

The handling section 28 may be a declining section as shown in FIG. 2, declining towards the windshield averted side 37 of the holder 13 in the mounted state at an angle between 15° and 45°, for example 30°. The handling section 28 can have a projection 25 at the free end 24 of the fixation tongue, allowing a better grip of a tool for example. The projection 25 may be an angled projection as shown in FIGS. 2, 6 to 8. The projection 25 can preferably be oriented parallel to the base element 17 in a disengaged state, i.e. with removed pin 19, like in FIG. 2.

For mounting the camera carrier 35 to the bracket 10, each pin 19 is inserted into the hollow space 21 of the corresponding holder 13 and moved further along the insertion direction 28, whereby the pin 19 moves along the fixation tongue 16, specifically along the protruding section 27 thereof, and bends back the fixation tongue 16 towards the windshield averted side 37 of the holder 13, until the pin 19 is fully received and thus locked in the notch 18 of the fixation tongue 16 and in the recess 41 of the holder 13.

The dismounting of the camera carrier 35 from the bracket 10 is described with respect to FIGS. 7 and 8. FIG. 7 shows three different states 16A, 16B, 16C of the fixation tongue 16. In the locked state 16A, the pin 19 is locked and kept fixed in the notch 18 and the recess 41. For dismounting, a simple tool 43 like a screwdriver can be used to act on the handling section 28, for example on the projection 25 thereof. The tool 43 can for example be used as a lever as shown in FIG. 7, where a leverage force 45 is applied. In this manner, the fixation tongue 16 moves from the locked state 16A through intermediate states 16B, 16C to the unlocked state 16D (see FIG. 8) where the pin 19 can be pulled easily out of the recess 41 and thus out of the holder 13 in order to disengage the camera carrier 35 from the bracket 10. The unlocking movement of the fixation tongue 16 is indicated by arrow 46 in FIG. 7.

While the above description constitutes the preferred embodiment of the present invention, it will be appreciated that the invention is susceptible to modification, variation and change without departing from the proper scope and fair meaning of the accompanying claims.

The invention claimed is:

1. A bracket adapted to be mounted to a window pane of a motor vehicle, comprising:
   a base part and at least one fixation arrangement configured to fixate a camera carrier carrying at least one camera to the bracket, wherein each of the at least one fixation arrangements comprises a holder and a spring element configured to exert an elastic locking force on a pin of the camera carrier, the holder forming a hollow space for receiving the pin,
   wherein the spring element forms a base element configured to be held in the holder, the spring element further comprises a fixation tongue bendably connected to the base element at one end and adapted to exert the elastic locking force on the pin of the camera carrier, the fixation tongue forms a notch formed to receive and hold the pin of the camera carrier in a mounted state.

2. The bracket as claimed in claim 1, further comprising in that the spring element is overmolded to the holder.

3. The bracket as claimed in claim 1, in that the spring element base element and fixation tongue are integrally formed as a single piece metal structure, and wherein the base element comprises in the form of a closed ring with a central opening completely surrounding the fixation tongue in a plan view of the spring element.

4. The bracket as claimed in claim 3, further comprising in that the fixation tongue extends through the central opening of the base element.

5. The bracket as claimed in claim 1, in that the fixation tongue comprises a handling section protruding to the outside of the holder through a mounting opening of the holder.

6. The bracket as claimed in claim 5, further comprising in that the handling section is arranged between the notch and a free end of the fixation tongue.

7. The bracket as claimed in claim 1, in that the fixation tongue comprises a protruding section protruding into the hollow space.

8. The bracket as claimed in claim 7, further comprising in that the protruding section is arranged between a connection end of the fixation tongue and the notch.

9. The bracket as claimed in claim 1, in that the holder comprises the hollow space having an insertion opening through which the pin of the camera carrier can be inserted into, and withdrawn from, the hollow space.

10. The bracket as claimed in claim 9, further comprising in that a connection end of the fixation tongue is positioned proximal to the insertion opening and a free end of the fixation tongue is positioned distal to the insertion opening.

11. The bracket as claimed in claim 1, in that the base element comprises a proximal connection section at a proximal end of the base element and a distal connection section at a distal end of the base element.

12. The bracket as claimed in claim 11, further comprising in that the proximal connection section or the distal connection section forms one or more connection holes enabling connection of the fixation tongue to the holder by overmolding.

13. The bracket as claimed in claim 1, further comprising in that the spring element is a single part made of a metal, or a sheet metal, or a spring metal.

14. The bracket as claimed in claim 1, further comprising in that the holder is integrally formed with the base part as a single part made of a thermoplastic.

\* \* \* \* \*